(12) United States Patent
Butt (10) Patent No.: US 8,271,543 B2
(45) Date of Patent: Sep. 18, 2012

(54) CREATION OF CONTEXT FOR COMMUNICATIONS BASED ON PREVIOUS INTERACTIONS

(75) Inventor: David Butt, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 449 days.

(21) Appl. No.: 12/021,217

(22) Filed: Jan. 28, 2008

(65) Prior Publication Data

US 2009/0193038 A1     Jul. 30, 2009

(51) Int. Cl.
G06F 17/30 (2006.01)
H04M 11/00 (2006.01)
(52) U.S. Cl. ........................................ 707/803; 455/405
(58) Field of Classification Search .......................... None
See application file for complete search history.

(56) References Cited

U.S. PATENT DOCUMENTS

| | | | |
|---|---|---|---|
| 6,282,275 B1* | 8/2001 | Gurbani et al. | 379/142.06 |
| 7,974,616 B1* | 7/2011 | Urbanek | 455/423 |
| 2002/0063735 A1* | 5/2002 | Tamir et al. | 345/745 |
| 2004/0205076 A1* | 10/2004 | Huang et al. | 707/100 |
| 2005/0232247 A1* | 10/2005 | Whitley et al. | 370/352 |
| 2006/0084478 A1* | 4/2006 | Erlichmen | 455/566 |
| 2007/0121584 A1* | 5/2007 | Qiu et al. | 370/352 |
| 2008/0109846 A1* | 5/2008 | Ewertz et al. | 725/37 |
| 2008/0313633 A1* | 12/2008 | Zhu et al. | 718/100 |
| 2009/0006548 A1* | 1/2009 | Ramanathan et al. | 709/204 |
| 2009/0141876 A1* | 6/2009 | Carter et al. | 379/112.01 |

OTHER PUBLICATIONS

Cisco Systems, Inc., Benefits of Deploying Cisco Unified Communications within a Cisco Intelligent Network, White Paper, copyright Cisco Systems, Inc. 1992-2007, available on the Internet at: <http://www.cisco.com/en/US/prod/collateral/voicesw/ps6882/ps6884/prod_white_paper()900aecd804259c0.pdf>.
Forrester Research, Inc., Unified Communication Industry Study, copyright Forrester Research, Inc. 2006, see www.forester.com.

* cited by examiner

*Primary Examiner* — Tarek Chbouki
(74) *Attorney, Agent, or Firm* — Charles E. Krueger (57) ABSTRACT

In one embodiment, an identification (ID) of a person involved in a current communication is utilized to access a communication log to determine an active time interval of a previous communication with the same person. The active time interval is utilized to identify the context material of the previous communication and access to the context material is provided during the current communication.

14 Claims, 8 Drawing Sheets

CALL LOG

| DATE | START TIME | LENGTH | ID |
|---|---|---|---|
| 08/22/2007 | 11:39 AM | 4:37 | (866)999-9999 JOE |
| 08/22/2007 | 11:45 AM | 0:01 | (866)888-8888 SAM |
| 08/22/2007 | 12:00 PM | 0:00 | (866)777-7777 SUE |

FIG. 1

USAGE LOG

| DATE | START TIME | URL |
|---|---|---|
| 08/22/2007 | 11:39 AM | www.budget.com |
| 08/22/2007 | 11:42 AM | www.maps.com |
| 08/22/2007 | 11:43 AM | www.stocks.com |

CREATION OF CONTEXT FOR COMMUNICATIONS BASED ON PREVIOUS INTERACTIONS

TECHNICAL FIELD

The present disclosure relates generally to recreation of a previous communication during a current communication.

BACKGROUND OF THE INVENTION

Communication is the sharing of information between two or more people. Discussions are based on a contextual environment of supporting material relevant to the topic at hand.

With the ubiquitous presence of the personal computer, much business and personal communication is conducted while either viewing information on a computer screen or utilizing application programs to generate or manipulate information during the course of the communication.

Sometimes this information is shared via web collaboration, but often each person is looking at unshared material displayed or generated locally.

DESCRIPTION OF EXAMPLE EMBODIMENTS

Overview

A method for creating a communication context includes receiving an identification (ID) of a person involved in a current communication. The ID is utilized to access a communication log to determine an active time interval between the start and finish times of a previous communication and a usage log is accessed to identify context material utilized during the active time interval. Access to context material is provided while the current communication is active.

Description

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1:
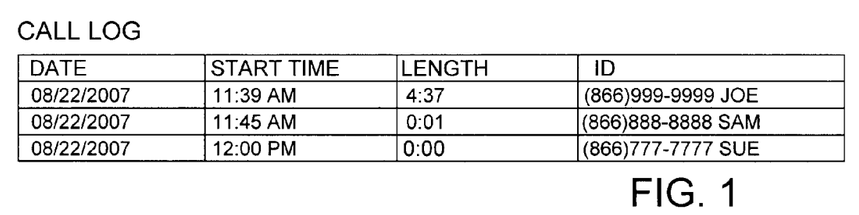
FIG. 1 illustrates an example of a call log.

A first example embodiment will now be described that utilizes locally maintained call logs and usage logs. An example of a call log is depicted in FIG. 1. At a minimum the call log includes the date of the call, start time of the call, length of the call (or alternatively finish time of the call), and an identifier of the other person participating in the call. FIG. 1 is only an example, and many other formats and types of information may be utilized without affecting the operation of this embodiment.

Figure 2:
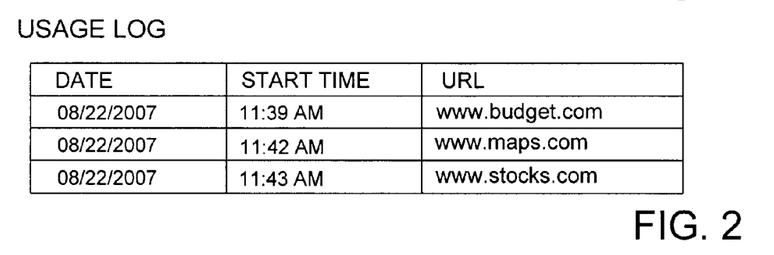
FIG. 2 illustrates an example of a usage log.

FIG. 2 depicts an example of a usage log utilized by a Web browser. At a minimum this usage log includes a URL (Uniform Resource Locator) of a Web page accessed and the date and time of the access.

Figure 3:
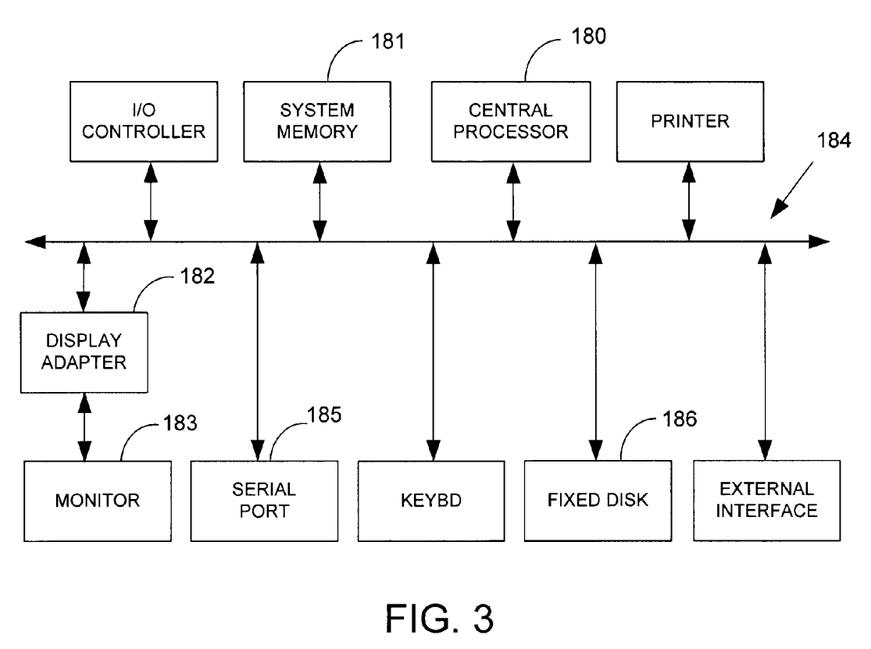
FIG. 3 illustrates an example workstation utilized to implement example embodiments.

FIG. 3 is an illustration of basic subsystems in a computer system workstation. In FIG. 3, subsystems are represented by blocks such as central processor 180, system memory 181 including random access memory (RAM) and/or read-only memory (ROM), display adapter 182, monitor 183, etc. The subsystems are interconnected via a system bus 184. Additional subsystems such as a printer, keyboard, fixed disk and others are shown. Peripherals and input/output (I/O) devices can be connected to the computer system by, for example, serial port 185. For example, serial port 185 can be used to connect the computer system to a modem for connection to a network, or serial port 185 can be used to interface with a mouse input device. The interconnection via system bus 184 allows central processor 180 to communicate with each subsystem and to control the execution of instructions from system memory 181 or fixed disk 186, and allows the exchange of information between subsystems. Other arrangements of subsystems and interconnections are possible.

Figure 4:
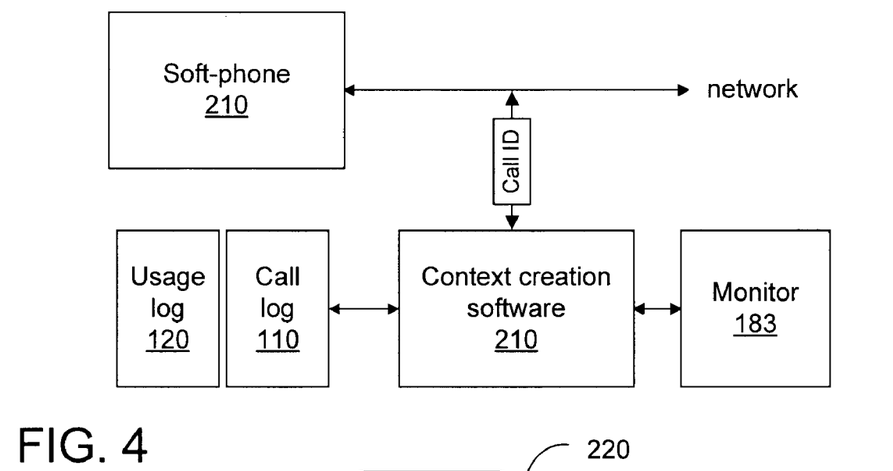
FIG. 4 illustrates an example architectural framework of a first example embodiment.

FIG. 4 is an architectural framework diagram of an example embodiment. In this example embodiment, the user utilizes a soft-phone 200 implemented by software operating on the workstation, and the call log 110 and usage log 120 are stored on the system memory 181 of the workstation. The context creation software 210 is coupled to receive a caller ID of a called or calling person. The context creation software 210 is also configured to have access to the memory 181 holding the call log 110 and usage log 120 and to the monitor 183.

Figure 5:
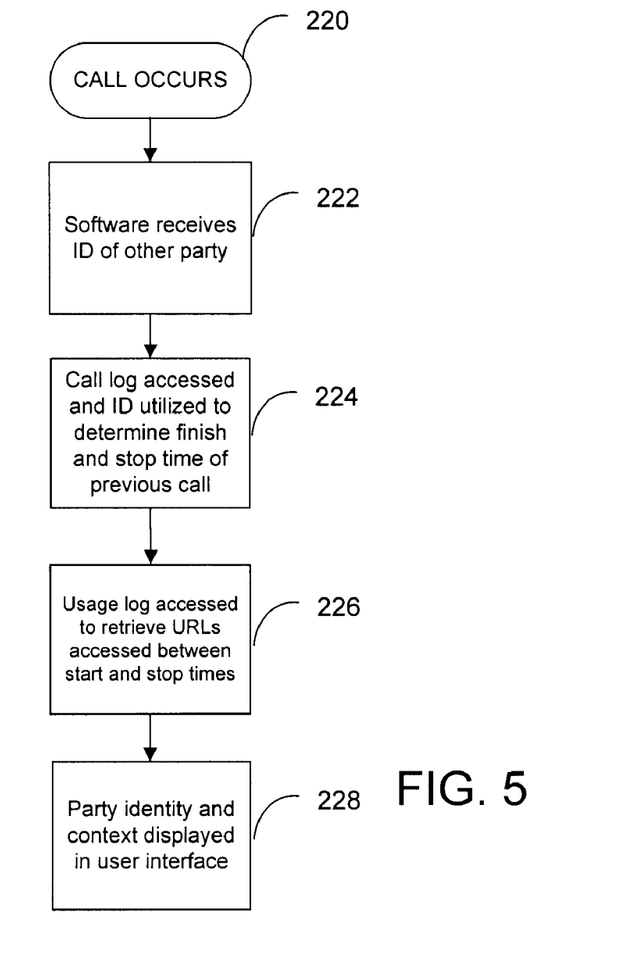
FIG. 5 illustrates the operation of the first example embodiment.

The operation of the example architectural framework will now be described with reference to the flow chart of FIG. 5. When a call occurs 220 the ID of the other person is provided to the context creation software 222. The ID is used to access the call log to determine the start and finish times of the most recent previous call between the parties 224. These times are then utilized to search the usage log, in this example the usage log created by the user's Web browser, to identify URLs accessed between the start and finish time of the previous call 226. These URLs are then displayed as the context of the present call 228.

Figure 6:
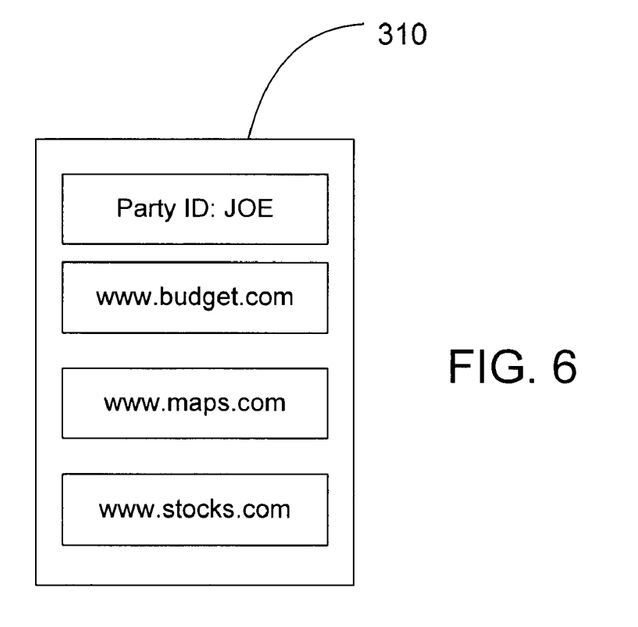
FIG. 6 illustrates an example user interface.

An example of a user interface for the currently described example embodiment is depicted in FIG. 6. In this example, when a call occurs, a pop-up window 310 appears that includes the identity of the other person in the call and the context of the previous call. In this example, links to context documents are displayed. The user can then select any item in the context that is relevant to the present call. Alternatively, the context creation software could launch all the web pages in the context.

In this example, if the user called Joe on the softphone the context creation software would receive the ID of Joe and utilize the ID to access the call log. In the example call log of FIG. 1 the previous call to Joe was made on Aug. 22, 2007 with a start time of 11:39 AM and finish time of 11:44:37 AM. The example Web browser usage log of FIG. 2 would be accessed to retrieve URLs of Web pages accessed between the start and finish times. The called person's name and context URLs are displayed in the user interface, in this example the pop-up window 310.

The present example embodiment utilizes the usage log of the Web browser by way of example not limitation. Other types of application software generate usage logs that may be utilized in this embodiment. For example, word processor programs keep track of time of creation, access and modification of a document. Accordingly, file pointers other than links can be displayed by the context creation software.

Another example embodiment will now be described where the context is dynamic and where the context creation software uses heuristics to determine what information is important to the communicating parties. Through the use of tagging and social networking other potentially useful documents could be added to the context as well.

Figure 7:
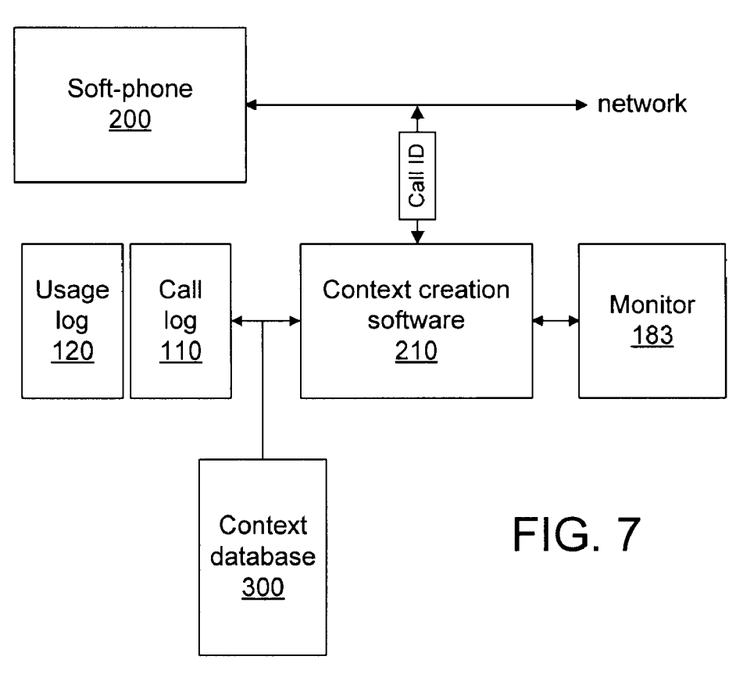
FIG. 7 illustrates the architectural framework of a second example embodiment.
Figure 8:
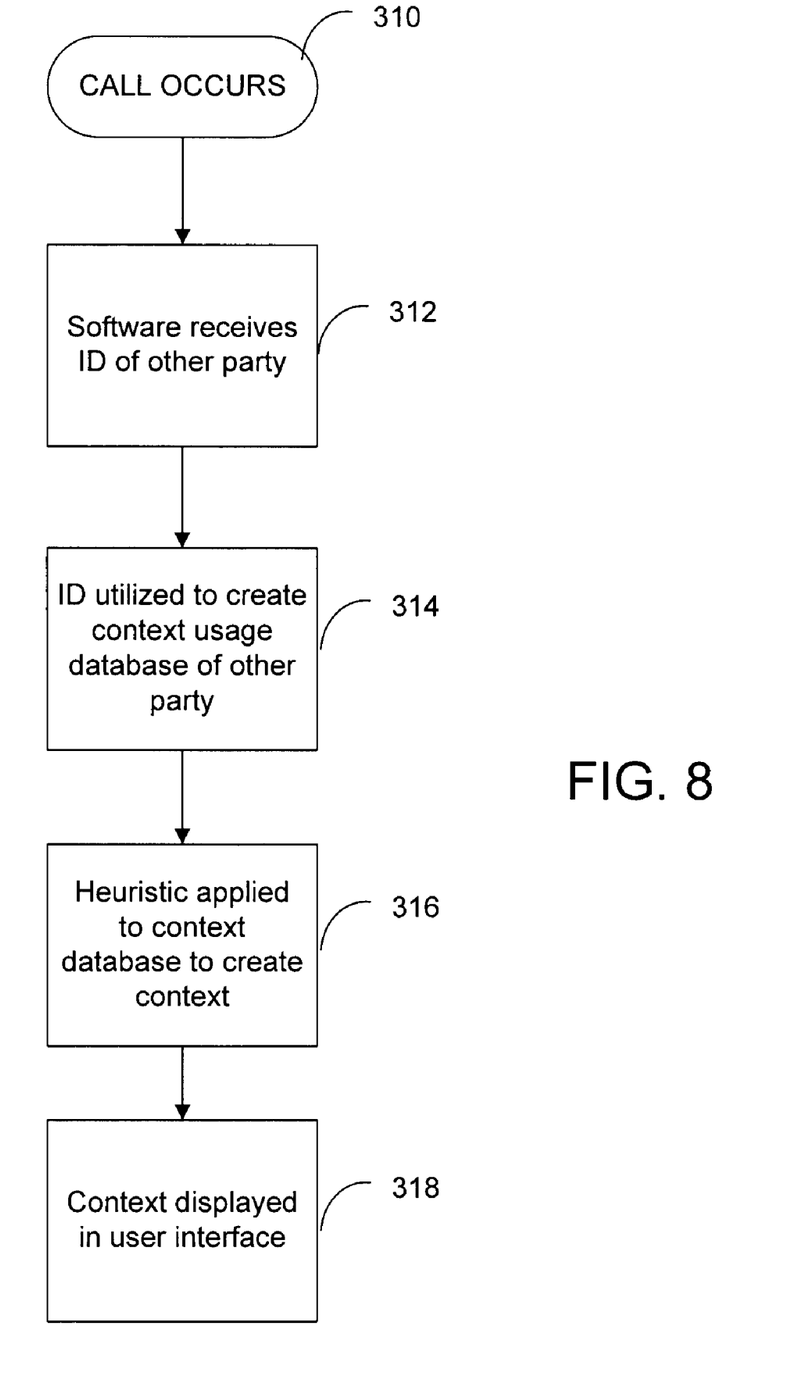
FIG. 8 illustrates the operation of the second example embodiment.

FIG. 7 depicts an example architectural framework for this embodiment. A context database 300 is included that is utilized by the context creation software 210 to store all information in the usage log relevant to a particular ID of another person. As depicted in the flow chart of FIG. 8, when a call occurs involving the other person a heuristic is utilized 316 to select the context displayed in the user interface.

Examples of heuristic algorithms include selecting most recently used items or the most frequently used items in the context database. Other heuristics could include forming associations with certain items so that when the item is selected associated items are also included in the heuristic.

Figure 9:
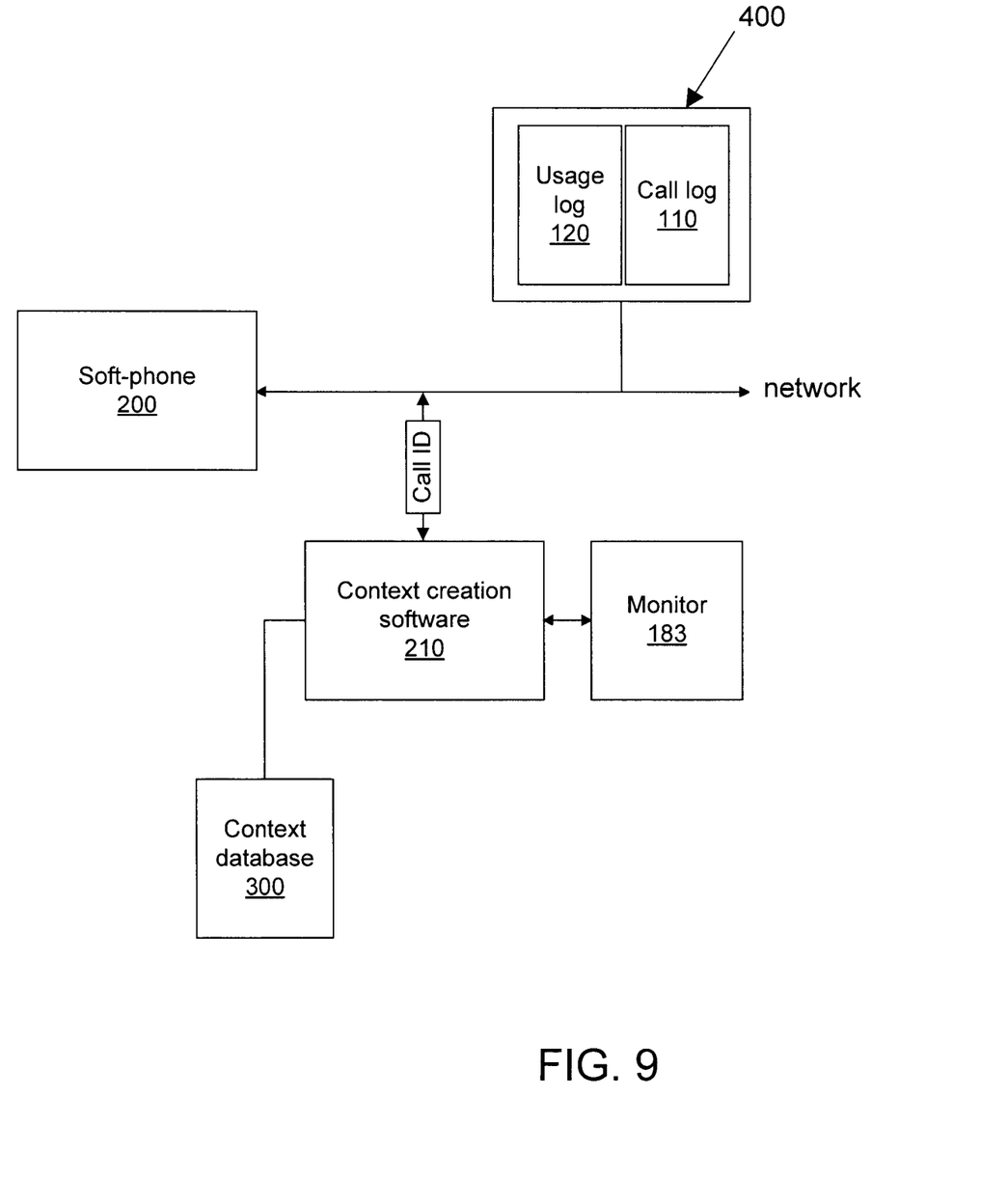
FIG. 9 is an example architectural framework of a third example embodiment.

In another embodiment, depicted in FIG. 9, the call log and/or usage log is stored centrally on a network server 400 remote from the user's workstation.

Figure 10:
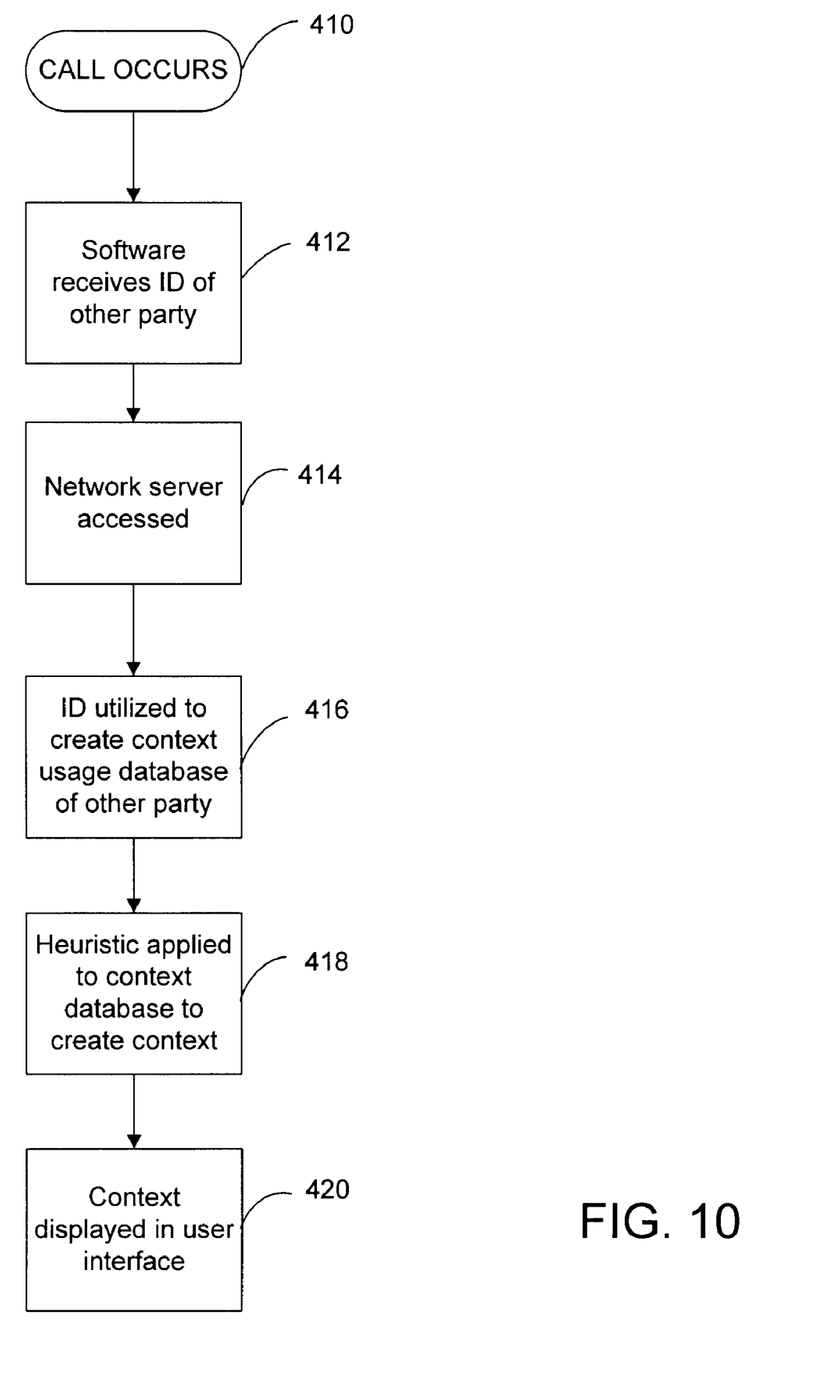
FIG. 10 illustrates the operation of the third example embodiment.

In this embodiment, as depicted in the flow chart of FIG. 10, after receiving the other party's ID the context creation software must access the server 414 to obtain information from the call log and usage log. The usage database can be created in the server or locally on the user's workstation.

In the above described example embodiments a softphone has been utilized. However, the embodiments described can be implemented utilizing external internet phones, cell phones, or phones connected to the standard switched telephone system. Call logs can be created for any type of phone and these call logs can be utilized by the example embodiments as described above.

Additionally, other types of logs may be utilized to determine search criteria to create a communication context. For example, instant messaging logs and email logs can be accessed to determine start and finish times of previous communications with another person.

Figure 11:
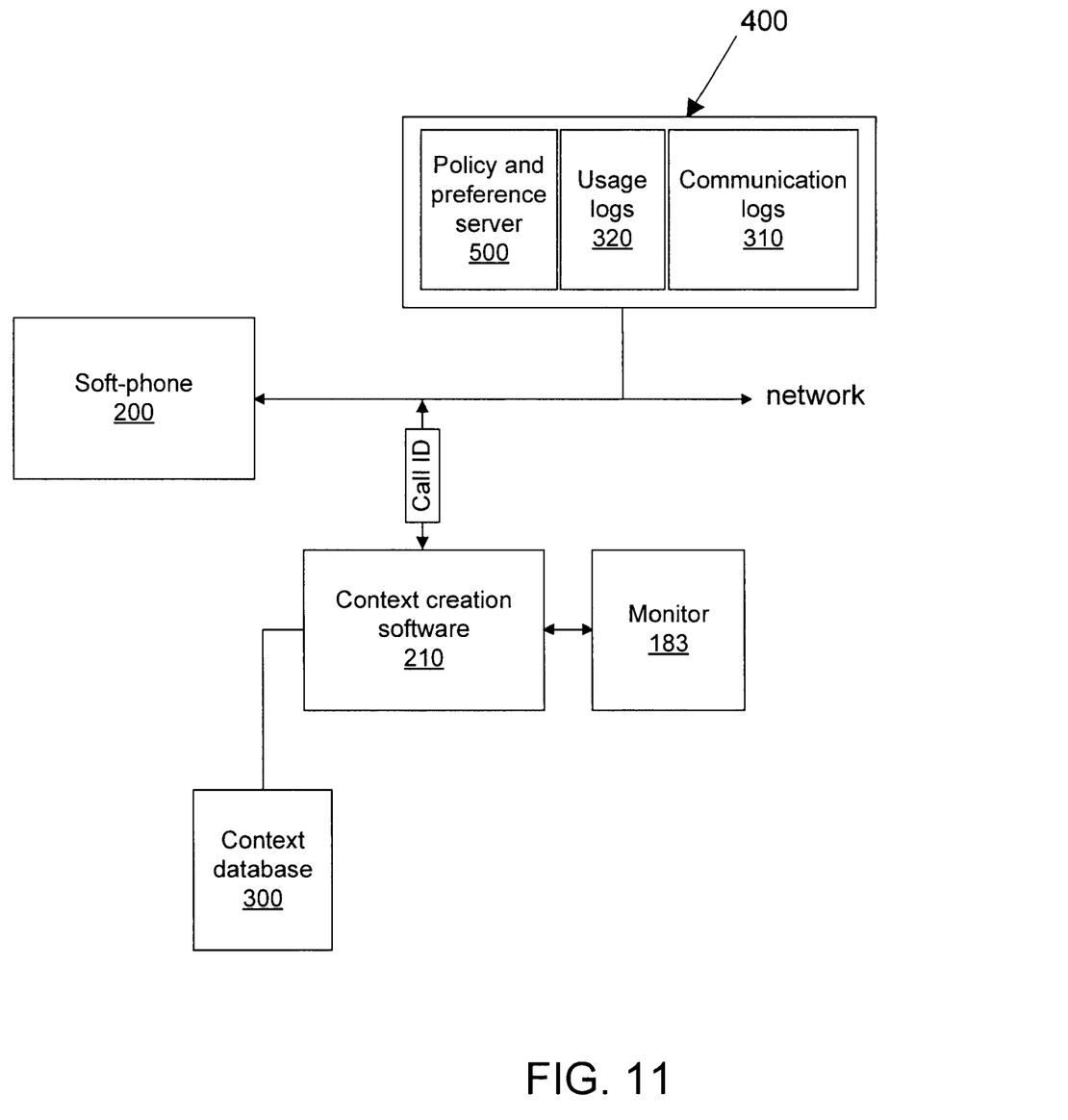
FIG. 11 is an example architectural framework of a fourth example embodiment.

Another example embodiment will now be described with reference to FIGS. 11 and 12 that considers all communications with another person and is not limited to the media used in a current communication with that person. In FIG. 11 multiple communication logs 310 and usage logs 320 are stored on a network server 400. Additionally a policy and preference server 500 operates on the network server 400.

Figure 12:
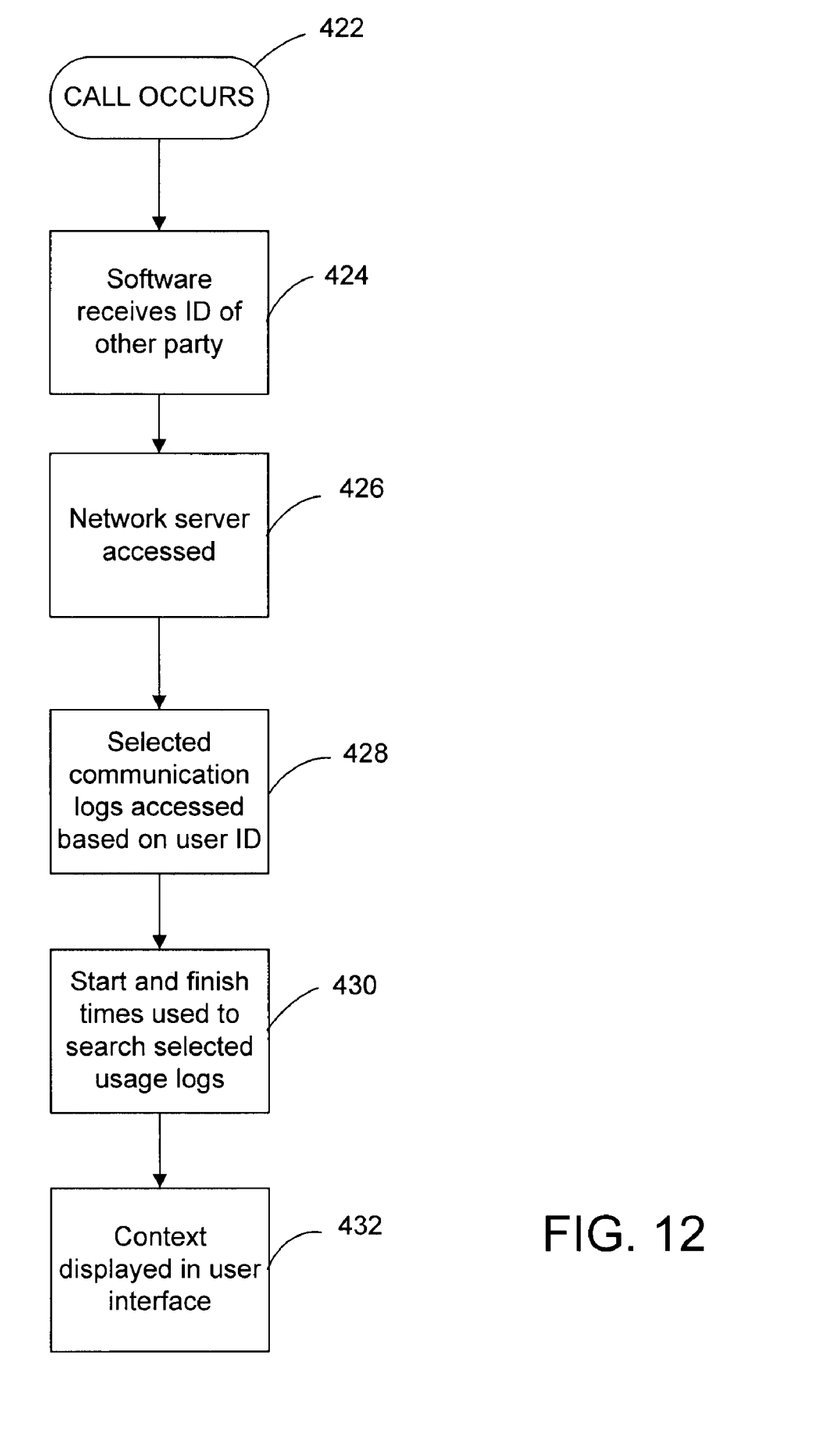
FIG. 12 illustrates the operation of the fourth example embodiment.

In FIG. 12, the context creation software receives the ID of the other party of a current communication 424. Selected communication logs, for example call logs, email logs, and instant messaging logs, are searched at the network server 428. The search is not limited to the media used for the current communication. For example, if the current communication were by telephone all other communication logs would be searched using the ID of the other party to the current communication.

The context creation software searches selected communication logs for the start and finish times of previous communications with the other party 430. These start and finish times are used to search selected usage logs for usages occurring between accessed start and finish times.

A user interface is then displayed that provides access to the communication context relevant to the current communication 432. As described above, the context information retrieved can be stored in a database and a heuristic performed to decide which items of context are made available for the present communication.

When a current communication is initiated the context creation software may access the policy and preference server to determine which modes of communication are available to the other party of the communication. This information is then used to structure the search for previous communications. Also, preferences related to the parties of the communication may be utilized by the context creation software to create a heuristic tailored to the preferences of the parties to the communication.

For example, the preferences may indicate that usage log data be searched for usages by the other party only after a certain date. This information would then be used by context creation software to tailor a heuristic for creating the context.

Example embodiments have been described above. Alternatives and substitutions will now be apparent to persons of skill in the art. For example, as understood by persons of ordinary skill, the actual locations of the various logs and databases in a network are not critical to practicing the invention. Accordingly, it is not intended to limit the invention except as provided by the appended claims.

What is claimed is:

1. A method comprising:

receiving a call to initiate a current communication, with the call including a caller identification (CID) identifying a caller;

accessing, using a processor executing context creation software, a locally maintained communication log, where the communication log includes entries each including a CID, a start time of a communication and an indication of the length of the communication, to determine an active time interval between start and finish times of a previous communication identified by the CID of the caller participating in a current communication;

searching, using the processor executing the context creation software and using only the start and finish times, a usage log, that is not part of the communication log, maintained locally by an application program that is not part of the context creation software, where the usage log includes entries each including an identifier of resource material accessed and an indication of the time that the resource material was accessed, to identify resource material accessed between the start and finish times of the active time interval; and providing, using the processor executing the context creation software, access to identified resource material while the current communication is ongoing.

2. The method of claim 1 further comprising:
displaying, using the processor, one or more pointers to the identified resource material in a user interface.

3. The method of claim 2 further comprising:
storing, using the processor, all identified resource material for the CID in a context database; and
applying, using the processor, a heuristic algorithm to the context database to determine which pointers to display.

4. The method of claim 3 wherein applying the heuristic algorithm comprises:
applying, using the processor, a most frequently used algorithm.

5. An apparatus comprising:
a memory storing context creation program code;
an external interface;
a processor coupled to the memory and the external interface, with the processor configured to execute the context creation program code to utilize the external interface to search one or more locally maintained communication logs, call logs or email logs to determine one or more active time intervals, each time interval having a start time and a finish time, of a communication identified by a caller identification (CID) included in a received call identification of a caller participating in a current communication, with the processor further configured to execute the context creation program code to utilize the external interface to search, using only the start and finish times, one or more usage logs, not included in the communication logs, maintained locally by an application program that is not part of the context creation program code, where each usage log includes entries each including an identifier of resource material accessed and an indication of the time that the resource material was accessed, to identify resource material accessed between the start and finish times of the one or more active time intervals and with the processor further configured to execute the context creation program code to provide access to identified resource material while the current communication is ongoing.

6. The apparatus of claim 5:
with the processor further configured to execute the context creation program code to display one or more pointers to identified resource material in a user interface.

7. The apparatus of claim 6:
with the processor further configured to execute the context creation program code to store all identified resource material in a context database; and
with the processor further configured to execute the context creation program code to apply a heuristic algorithm to the context database to determine which pointers to display.

8. The apparatus of claim 7:
with the processor further configured to execute the context creation program code to apply a most frequently used algorithm.

9. One or more non-transitory computer readable storage media with an executable context creation program stored thereon, wherein the program instructs a processor to:
access a locally maintained communication log, where the communication log includes entries each including an caller identification (CID), a start time of a communication and an indication of the length of the communication, to determine an active time interval between start and finish times of a previous communication identified by a (CID) included in a received call identifying a caller participating in a current conversation;
search, using only the start and finish times, a usage log, that is not part of the communication log, maintained locally by an application program that is not part of the context creation program, where the usage log includes entries each including an identifier of resource material accessed and an indication of the time that the resource material was accessed, to identify identified resource material accessed between the start and finish times of the active time interval; and
provide access to identified resource material while the current communication is ongoing.

10. The one or more non-transitory computer readable storage media of claim 9 wherein the context creation program further instructs the processor to:
display one or more pointers to the identified resource material in a user interface.

11. The one or more non-transitory computer readable storage media of claim 10 wherein the context creation program further instructs the processor to:
store all identified resource material for the CID in a context database; and
apply a heuristic algorithm to the context database to determine which pointers to display.

12. The one or more non-transitory computer readable storage media of claim 11 wherein the context creation program that instructs the processor to apply the heuristic algorithm further instructs the processor to:
apply a most frequently used algorithm.

13. An apparatus comprising:
a memory storing context creation program code, a locally maintained communication log having entries including a caller identification (CID), a start time and indication of the length of the communication, and a usage log, that is not part of the communication log, maintained locally by an application program that is not part of the context creation program code having entries including an identifier of resource material accessed and an indication of the time when the resource material was accessed; and
a processor, coupled to access the memory, configured to execute the context creation program code to utilize a (CID) included in a received call identifying a caller participating in a current conversation to access the communication log to determine an active time interval between start and finish times of a previous communication identified by the CID of the caller participating in a current conversation, to search, using only the start and finish times, the usage log to identify resource material accessed between the start and finish times of the active time interval, and to provide access to identified resource material while the current communication is ongoing.

14. The apparatus of claim 13 with the processor further configured to execute the context creation program code to:
display one or more pointers to the identified resource material in a user interface.

* * * * *